United States Patent
Wang et al.

(10) Patent No.: US 12,481,018 B2
(45) Date of Patent: Nov. 25, 2025

(54) BEAMFORMING PREDICTION DEVICE, METHOD AND PROGRAM

(71) Applicant: NTT, Inc., Tokyo (JP)

(72) Inventors: Yitu Wang, Musashino (JP); Takayuki Nakachi, Musashino (JP)

(73) Assignee: NTT, Inc., Tokyo (JP)

( * ) Notice: Subject to any disclaimer, the term of this patent is extended or adjusted under 35 U.S.C. 154(b) by 285 days.

(21) Appl. No.: 18/020,572

(22) PCT Filed: Aug. 14, 2020

(86) PCT No.: PCT/JP2020/030910
§ 371 (c)(1),
(2) Date: Feb. 9, 2023

(87) PCT Pub. No.: WO2022/034692
PCT Pub. Date: Feb. 17, 2022

(65) Prior Publication Data
US 2023/0327724 A1    Oct. 12, 2023

(51) Int. Cl.
| | | |
|---|---|---|
| *H01Q 3/00* | (2006.01) | |
| *G01S 5/02* | (2010.01) | |
| *H01Q 3/01* | (2006.01) | |
| *H04B 7/06* | (2006.01) | |

(52) U.S. Cl.
CPC ...... *G01S 5/02524* (2020.05); *G01S 5/02525* (2020.05); *G01S 5/0294* (2013.01);
(Continued)

(58) Field of Classification Search
CPC ............ G01S 5/02524; G01S 5/02525; G01S 5/02529; G01S 5/0294; H01Q 3/00; H01Q 3/01; H04B 7/0617
(Continued)

(56) References Cited

U.S. PATENT DOCUMENTS

| | | | | |
|---|---|---|---|---|
| 8,914,031 | B2 * | 12/2014 | Cho ................... | H04W 16/28 |
| | | | | 343/714 |
| 10,686,507 | B2 * | 6/2020 | Wang ................ | H04B 7/0897 |
| 11,304,063 | B2 * | 4/2022 | Moon ................ | H04W 16/28 |

FOREIGN PATENT DOCUMENTS

| | | | | |
|---|---|---|---|---|
| CN | 106604228 B | * | 6/2019 | ........... G01S 5/0252 |
| EP | 4171094 A1 | * | 4/2023 | ........... H04B 7/0456 |

(Continued)

OTHER PUBLICATIONS

Z. Zhang et al., "Position Fingerprint-Based Beam Selection in Millimeter Wave Heterogeneous Networks", School of Communication and Information Engineering, Chongqing University of Posts and Telecommunications, Chongqing 400065, China, Published: Sep. 1, 2017.*

(Continued)

*Primary Examiner* — Chuong P Nguyen
(74) *Attorney, Agent, or Firm* — Harness, Dickey & Pierce, P.L.C.

(57) ABSTRACT

The present disclosure is to perform beamforming corresponding to the influence of a dynamic environment in which a user moves. The present disclosure relates to a beamforming prediction device that includes: a storage unit that stores a dictionary D obtained by learning fingerprints based on trajectories, and a fingerprint database based on trajectories; a trajectory prediction unit that calculates a trajectory of a mobile terminal, using location information about the mobile terminal; a fingerprint estimation unit that applies the trajectory of the mobile terminal to an input of the dictionary D, and calculates the sparse coefficient X corresponding to the trajectory of the mobile terminal; and a beamforming calculation unit that calculates beamforming (Continued)

of the mobile terminal, using the sparse coefficient X calculated by the fingerprint estimation unit and the fingerprint database.

5 Claims, 10 Drawing Sheets

(52) U.S. Cl.
CPC ............ *G01S 5/02529* (2020.05); *H01Q 3/01* (2013.01); *H04B 7/0617* (2013.01)

(58) Field of Classification Search
USPC ........................................ 342/367, 371, 372
See application file for complete search history.

(56) References Cited

FOREIGN PATENT DOCUMENTS

| WO | WO-2019112499 A1 * | 6/2019 | ............. H04B 7/063 |
|----|--------------------|--------|--------------------------|
| WO | WO-2024033547 A1 * | 2/2024 | ......... H04B 7/04026   |

OTHER PUBLICATIONS

S. Park et al., "Utilization of Beam Signatures Supporting High User Mobility With Extremely Low Feedback Overhead", Department of Electronic Engineering, Sogang University, Seoul 04107, South Korea, Publication—May 3, 2022, Date of current version—May 6, 2022.*
K. Satyanarayana et al, "Deep learning aided fingerprint-based beam alignment for mmWave vehicular communication", IEEE Trans. Veh. Technol., vol. 68, No. 11, pp. 10858-10871, Sep. 2019.
M. Li et al, "Explore and eliminate: optimized two-stage search for millimeter-Wave beam alignment", IEEE Trans. Wireless Commun., vol. 18, No. 9, pp. 4379-4393, Jun. 2019.
J. Wright, A. Yang, A. Ganesh, S. Sastry, and Y. Ma, "Robust face recognition via sparse representation", IEEE Trans. Pattern Anal. Machine Intell., vol. 31, No. 2, pp. 210-227, Feb. 2009.
"5G channel model for bands up to 100 GHz", http://www.5gworkshops.com/5GCM.html, 2015.
V. V. Unhelkar et al, "Human-aware robotic assistant for collaborative assembly: Integrating human motion prediction with planning in time", IEEE Robot. Autom. Lett., vol. 3, No. 3, pp. 2394-2401, Mar. 2018.
V. Raghavan et al, "Statistical blockage modeling and robustness of beamforming in millimeter-Wave systems", IEEE Trans. Micro. Theory Tech., vol. 67, No. 7, pp. 3010-3024, Mar. 2019.
F. Negro et al, "On the MIMO interference channel", Proc. of ITA, pp. 1-9, Feb. 2010.
I.K. Jain et al, "The impact of mobile blockers on milimeterwave cellular systems", IEEE J. Sel. Areas Commun., vol. 37, No. 4, pp. 854-868, Apr. 2019.

* cited by examiner

FINGERPRINT DATABASE

| Grid | Trajectory | Traffic | Fingerprint (Beam-pair, Average RSS) | |
|---|---|---|---|---|
| 1 | a | $\lambda$ | $(AoA, AoD)_1$, −65 $dBm$, | $(AoA, AoD)_2$, −68 $dBm$, |
| 1 | b | $\lambda$ | $(AoA, AoD)_7$, −62 $dBm$, | $(AoA, AoD)_9$, −65 $dBm$, |
| 2 | a | $\lambda$ | $(AoA, AoD)_4$, −69 $dBm$, | $(AoA, AoD)_6$, −70 $dBm$, |
| 2 | b | $\lambda$ | $(AoA, AoD)_5$, −66 $dBm$, | $(AoA, AoD)_8$, −72 $dBm$, |

| PARAMETER | VALUE |
|---|---|
| CARRIER FREQUENCY | 28GHz |
| HEIGHT OF BASE STATION | 7m |
| HEIGHT OF MOBILE TERMINAL | 1m |
| HEIGHT OF VEHICLE | Gaussian(1.8, 0.2) |
| NUMBER OF VEHICLES | Poisson($\lambda$) |
| RECEIVING ANTENNA $N_R$ | 8 |
| TRANSMISSION POWER | 0dBW |
| TRANSMITTING ANTENNA $N_T$ | 32 |

BEAMFORMING PREDICTION DEVICE, METHOD AND PROGRAM

CROSS-REFERENCE TO RELATED APPLICATIONS

This application is a 371 U.S. National Phase of International Application No. PCT/JP2020/030910, filed on Aug. 14, 2020. The entire disclosure of the above application is incorporated herein by reference.

TECHNICAL FIELD

The present disclosure relates to a high-speed beamforming technology for next-generation mobile communications.

BACKGROUND ART

A beamforming technology for maintaining communication quality of mobile terminals has been actively studied in next-generation mobile communications such as Beyond 5G and 6G. To realize high-speed beamforming, a method using a fingerprint has been suggested (see Non Patent Literature 1, for example). With a fingerprint, beamforming data is collected in accordance with the location of the user, and a deep neural network is applied to the collected data, so that beamforming is performed.

A fingerprint includes information about a radio wave propagation space of millimeter waves, and it is expected to realize high-speed beamforming with the use of this information. However, a fingerprint based on a conventional (stationary) position in the dynamic environment in which the user moves cannot correctly reflect the millimeter-wave transmission state affected by an obstacle in the surrounding environment or movement of the user.

CITATION LIST

Non Patent Literature

Non Patent Literature 1: K. Satyanarayana, et al, "Deep learning aided fingerprint-based beam alignment for mmWave vehicular communication," IEEE Trans. Veh. Technol., vol. 68, no. 11, pp. 10858-10871, September 2019.

Non Patent Literature 2: M. Li, et al, "Explore and eliminate: optimized two-stage search for millimeter-Wave beam alignment," IEEE Trans. Wireless Commun., vol. 18, no. 9, pp. 4379-4393, June 2019.

Non Patent Literature 3: J. Wright, A. Yang, A. Ganesh, S. Sastry, and Y. Ma, "Robust face recognition via sparse representation," IEEE Trans. Pattern Anal. Machine Intell., vol. 31, no. 2, pp. 210-227, February 2009.

Non Patent Literature 4: "5G channel model for bands up to 100 GHz," http://www.5gworkshops.com/5GCM.html, 2015.

Non Patent Literature 5: V. V. Unhelkar, et al, "Human-aware robotic assistant for collaborative assembly: Integrating human motion prediction with planning in time," IEEE Robot. Autom. Lett., vol. 3, no. 3, pp. 2394-2401, March 2018.

Non Patent Literature 6: V. Raghavan, et al, "Statistical blockage modeling and robustness of beamforming in millimeter-Wave systems," IEEE Trans. Micro. Theory Tech., vol. 67, no. 7, pp. 3010-3024, March 2019.

Non Patent Literature 7: F. Negro, et al, "On the MIMO interference channel," Proc. of ITA, pp. 1-9, February 2010.

Non Patent Literature 8: I. K. Jain, et al, "The impact of mobile blockers on milimeterwave cellular systems, "IEEE J. Sel. Areas Commun., vol. 37, no. 4, pp. 854-868, April 2019.

SUMMARY OF INVENTION

Technical Problem

The present disclosure aims to perform beamforming corresponding to the influence of a dynamic environment in which the user moves.

Solution to Problem

The present disclosure suggests a fingerprint based on a trajectory of a user, so as to correctly reflect a millimeter-wave transmission state. The present disclosure also enables prediction of beamforming at high speed, using sparse coding.

A beamforming prediction device according to the present disclosure includes:
  a storage unit that stores a dictionary D obtained by learning fingerprints based on trajectories, and a fingerprint database based on trajectories;
  a trajectory prediction unit that calculates a trajectory of a mobile terminal, using location information about the mobile terminal;
  a fingerprint estimation unit that applies the trajectory of the mobile terminal to an input of the dictionary D, and calculates the sparse coefficient X corresponding to the trajectory of the mobile terminal; and
  a beamforming calculation unit that calculates beamforming of the mobile terminal, using the sparse coefficient X calculated by the fingerprint estimation unit and the fingerprint database.

A beamforming prediction method according to the present disclosure includes:
  calculating a trajectory of a mobile terminal, using location information about the mobile terminal, using a trajectory prediction unit;
  referring to a dictionary D obtained by learning a fingerprint database based on trajectories, applying the trajectory of the mobile terminal to an input of the dictionary D, and calculating the sparse coefficient X corresponding to the trajectory of the mobile terminal, using a fingerprint estimation unit; and
  calculating beamforming of the mobile terminal, using the sparse coefficient X calculated by the fingerprint estimation unit and the fingerprint database, using a beamforming calculation unit.

A beamforming program according to the present disclosure is a program for causing a computer to carry out the respective steps included in the beamforming prediction method according to the present disclosure, and is a program for causing a computer to function as the respective functional units included in the beamforming prediction device according to the present disclosure.

Advantageous Effects of Invention

According to the present disclosure, appropriate beamforming can be performed on the basis of the trajectory of the user. Accordingly, it is possible to maintain the optimum transmission rate corresponding to movement of the user and the influence of the surrounding environment. Thus, the present disclosure enables effective utilization of network resources, and can significantly enhance communication quality of a mobile communication network using millimeter waves.

DESCRIPTION OF EMBODIMENTS

The following is a detailed description of embodiments of the present disclosure, with reference to the drawings. Note that the present disclosure is not limited to the embodiments described below. These embodiments are merely examples, and the present disclosure can be carried out in forms with various modifications and improvements based on the knowledge of those skilled in the art. Note that like components are denoted by like reference numerals in this specification and the drawings.

Outline of the Present Disclosure

Figure 1:
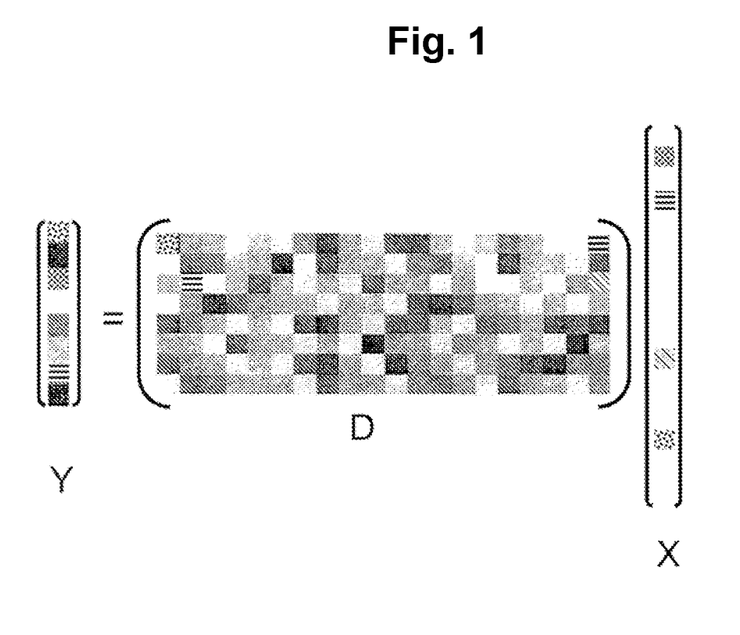
FIG. 1 is a diagram for explaining sparse coding.

A test sample Y can be expressed as shown in FIG. 1, with a dictionary D and a sparse coefficient X (see Non Patent Literature 3, for example). In the present disclosure, the trajectory of a mobile terminal in a fingerprint database is applied to the test sample Y, and the sparse coefficient X is learned with the dictionary D. The learned sparse coefficient X represents the weights to be assigned to the individual trajectories in the fingerprint database. The present disclosure derives the sparse coefficient X corresponding to the trajectory of a mobile terminal, using sparse coding, and determines the base station to which the mobile terminal is connected and the parameters of beamforming for performing communication with the base station, using the derived sparse coefficient X.

(Beamforming)

Figure 2:
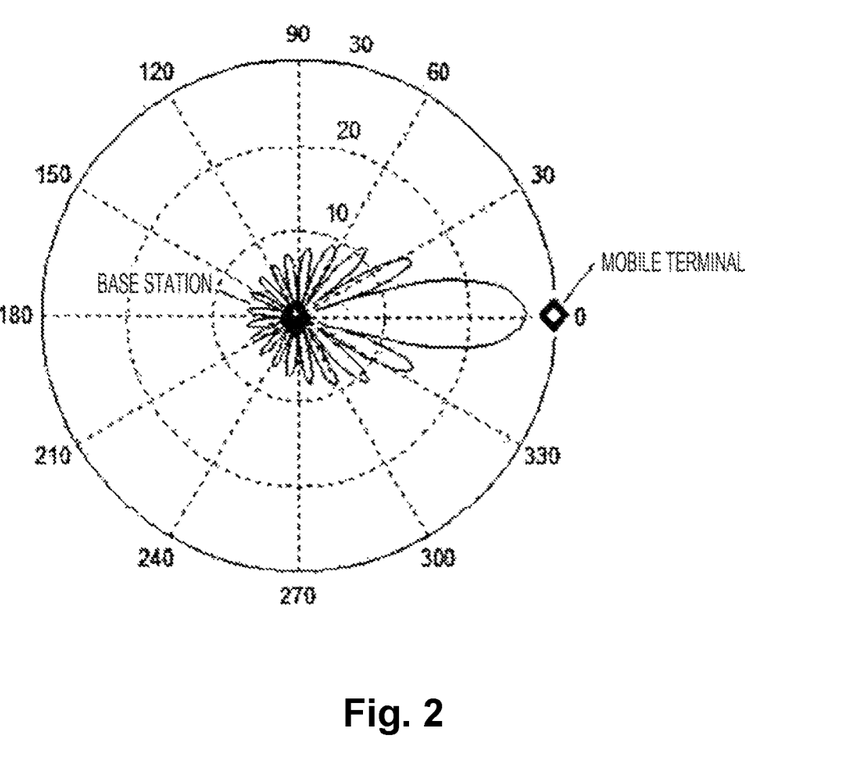
FIG. 2 illustrates an example of beamforming.

FIG. 2 illustrates an example of beamforming. Beamforming includes an angle of arrival φ and an angle of departure θ as parameters. In the present disclosure, these parameters are used as a trajectory-based fingerprint database and beamforming. Note that an angle of arrival may be referred to as AoA. Also, an angle of departure may be referred to as AoD. Radio field strength may be referred to as received signal to noise strength (RSS).

Figure 6:
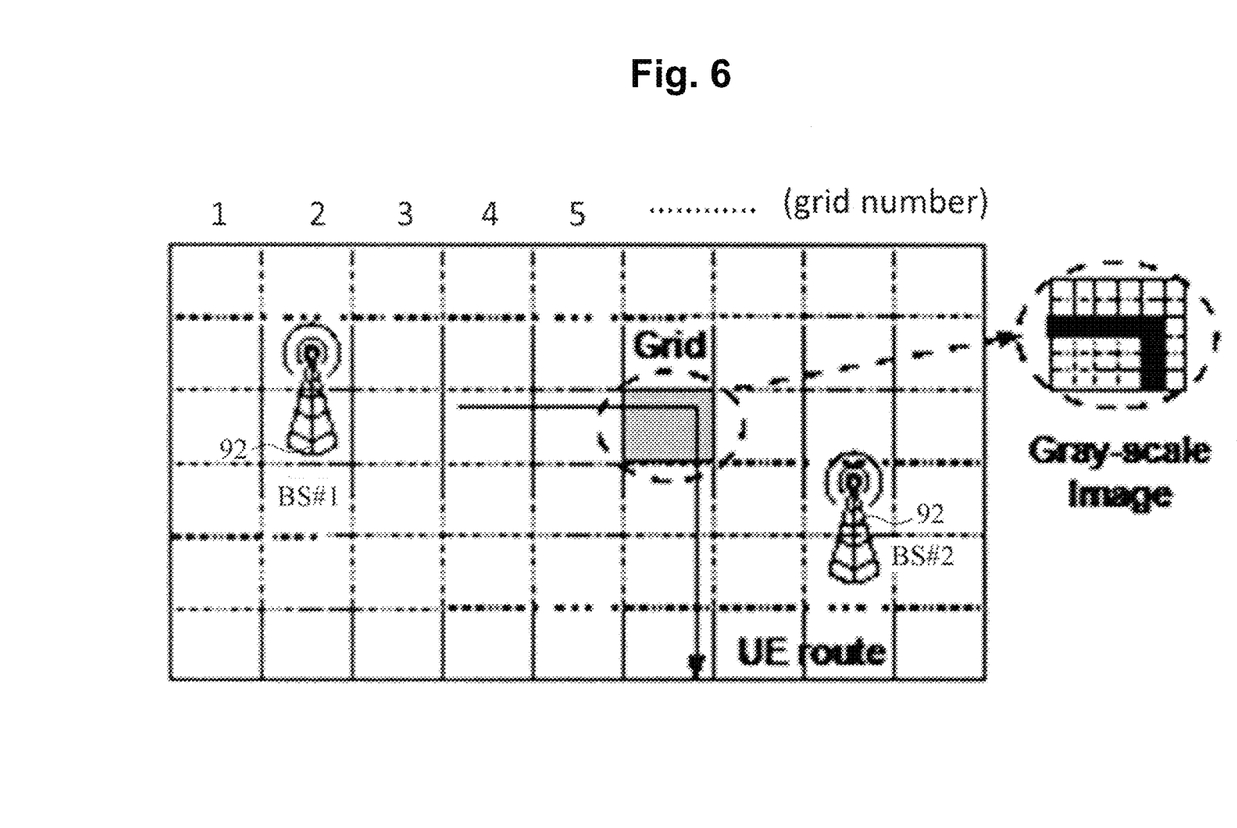
FIG. 6 is a diagram for explaining fingerprint information.

In a state where "i" represents an identifier $i \in \{1, \ldots, N^{Beam}\}$ of a grid illustrated in FIG. 6 to be described later, and "l" represents a beam pair $l \in \{1, \ldots, N^{Beam}\}$, beamforming a $(\varphi^{i,\,l}, \theta^{i,\,l})$ can be expressed by the following expression.

[Mathematical Expression 1]

$$a \cdot (\phi^{i,l}, \theta^{i,l}) = \frac{1}{\sqrt{Y_x Z_x}} \Big[ 1, \ldots, \quad (1)$$
$$e^{-jkg(m\sin(\phi^{i,l})\sin(\theta^{i,l}) + n\cos(\theta^{i,l}))}, \ldots, e^{-jkg((Y_x-1)\sin(\phi^{i,l})\sin(\theta^{i,l}) + (Z_x-1)\cos(\theta^{i,l}))} \Big],$$

Here, the beam pair is a pair of the kth base station 92 and the jth trajectory, and satisfies $k \in \{1, \ldots, N_i^{BS}\}$, and $j \in \{1, \ldots, N_i^{Trajectory}\}$.

Further, the parameters are as follows.

Yx: the number of antennas arranged along a horizontal axis, $Yx = Y_T$ when the antennas are used in a transmitter and $Yx = Y_R$ when the antennas are used in a receiver Zx: the number of antennas arranged along a vertical axis, $Zx = Z_T$ when the antennas are used in a transmitter and $Zx = Z_R$ when the antennas are used in a receiver g: antenna pitch m: an integer of [0, Yx−1]

n: an integer of [0, Zx−1]

(System Model According to the Present Disclosure)

Attenuation of a millimeter-wave signal due to an obstacle in the environment can be calculated with a Double Knife Edge Diffraction model (see Non Patent Literature 6, for example). The influence of motion of a user on propagation of a millimeter-wave signal can be calculated with a Self Blockage model (see Non Patent Literature 8, for example). Therefore, a millimeter-wave transmission state can be expressed by the following expression.

[Mathematical Expression 2]

$$H(\tau) = \kappa \underbrace{\sum_{i=1}^{N_{cl}} \sum_{l=1}^{N_{ray,i}} \alpha_{i,l} \sqrt{L(d_{i,l})}\, a_R(\phi_R^{i,l}, \theta_R^{i,l}) a_T^H(\phi_T^{i,l}, \theta_T^{i,l}) h(\tau - \tau_{i,l})}_{\text{Scattered propagation paths}} + \quad (2)$$

$$\underbrace{I_{LOS} \sqrt{N_R N_T}\, e^{j\eta} \sqrt{L(d)}\, a_R(\phi_{LOS}, \theta_{LOS}) a_T^H(\phi_{LOS}, \theta_{LOS}) h(\tau - \tau_{LOS})}_{\text{LOS path}}$$

Here, the parameters are as follows.

L $(d_{i,\,l})$: attenuation of a path gain related to the (i, l)th propagation path $d_{i,\,l}$: path length aR(·) and aT(·): normalized response vectors of reception and transmission arrays, which vary with angles of arrival and angles of departure h: impulse response τ: current time $\tau_{i,\,l}$: $\tau_{i,\,l} = d_{i,\,l}/c$ being a propagation delay related to the (i, l)th path $I_{LOS}$: an indicator function indicating the presence of an LOS path The height of the base station, the height of the mobile terminal, and the height of the vehicle are used to recognize the presence of an LOS path.

$N_R$: the number of antennas of the receiver $N_T$: the number of antennas of the transmitter ejη: imaginary part L(d): attenuation of a path d·, which is expressed by the following expression (logarithmic unit).

Figure 10:
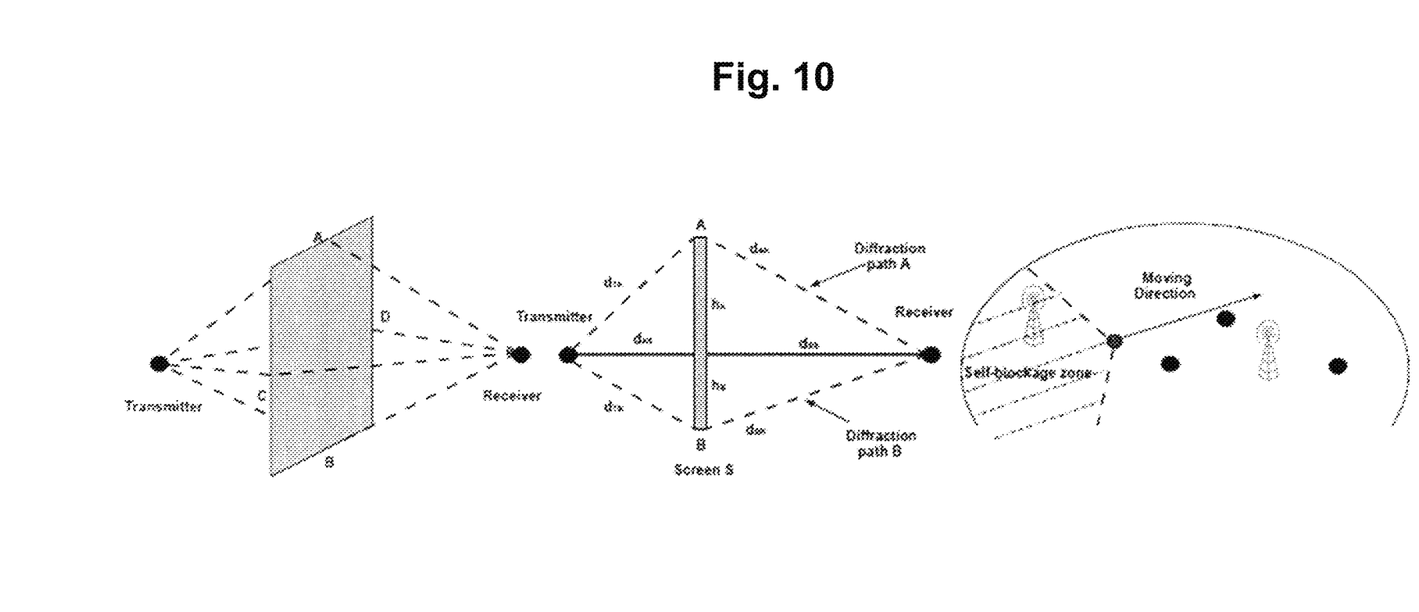
FIG. 10 is a diagram for explaining a double knife edge diffraction (DKED) model.

[Mathematical Expression 21]

$$L(d) = -20\log_{10}(4\pi/\lambda^{mmWave}) - 10n(1 - b + bc/(\lambda^{mmWave}f_0))\log_{10}d - X_e \quad (21)$$

κ: κ=$2\pi/\lambda^{mmwave}$ being a constant
$\lambda^{mmWave}$: the wavelength of millimeter waves
n: path loss index
b: system parameter
$f_0$: carrier frequency
$X_\sigma$: Gaussian distributed shadow fading that accompany zero average and $\sigma^2$ variance To calculate the attenuation caused by an obstacle in the environment, a double knife edge diffraction (DKED) model recommended by the ITU Radiocommunication Sector (ITU-R) is adopted as illustrated in FIG. 10. The obstacle is modeled as a screen with four edges A, B, C, and D. The shadowing caused by the edge A is expressed by the following expression.

[Mathematical Expression 3]

$$F_A = \frac{\tan^{-1}\left(0.5\pi\sqrt{\pi(d_{TA} - d_{AK} - d_{AS} - d_{RS})/\lambda^{mmWave}}\right)}{\pi}, \quad (3)$$

Here, $\lambda^{mmWave}$ represents the wavelength of millimeter waves. $d_{TA}$ represents the distance from the transmitter to the edge A of the obstacle, $d_{AR}$ represents the distance from the edge A of the obstacle to the receiver, $d_{TS}$ represents the distance from the transmitter to the obstacle, and $d_{BS}$ represents the distance from the obstacle to the receiver. The shadowing $F_B$, $F_C$, and $F_D$ caused by the edges B, C, and D can be acquired in the same manner as $F_A$. The overall shadowing attenuation is expressed by the following expression.

[Mathematical Expression 4]

$$L_S[dB] = -20\log_{10}(1-(F_A+F_B)(F_C+F_D)). \quad (4)$$

As shown in Expression (2), in a millimeter-wave transmission state, beamforming a ($\varphi^{i, l}$, $\theta^{i, l}$) is included in the influence of motion of the user. Therefore, the present disclosure enables prediction of a millimeter-wave transmission state by learning a fingerprint corresponding to the trajectory of a mobile terminal.

Also, in the present disclosure, the "maximum R problem" is transformed into a sparse coding problem. RSS or the maximum transmission rate R is included in the learning parameters of the dictionary D. Accordingly, by obtaining the sparse coefficient X corresponding to the trajectory of a mobile terminal 92, it is possible to obtain the fingerprint that maximizes the transmission rate. The maximum transmission rate R can be calculated according to the following expression (see Non Patent Literature 7, for example).

[Mathematical Expression 5]

$$R = \log_2 \det\left[1 + L^{-1}\left(\frac{Pr}{M}E^H AA^H E\right)\right], \quad (5)$$

Here, the parameters are as follows.
[Mathematical Expression 51]

$$L = E^H\left(\frac{P_T}{M}A_I A_I^H + \sigma_w^2 BC_w B^H\right)E \quad (51)$$

[Mathematical Expression 52]

$$C_\omega = \mathbb{E}[w(l)w^H(l)] \quad (52)$$

$P_T$: transmission power
M: signal dimension
$\sigma_\omega$: linear minimum mean square error The linear minimum mean square error may be used to estimate an M-dimensional signal s^(l).

In Expression (5), the linear minimum mean square error is used to estimate the M-dimensional signal s^(1) expressed by the following expression.
[Mathematical Expression 53]

$$\hat{s}(l) = E^H(As(l) + A_I s_I(l) + Bw) \quad (53)$$

Figure 3:
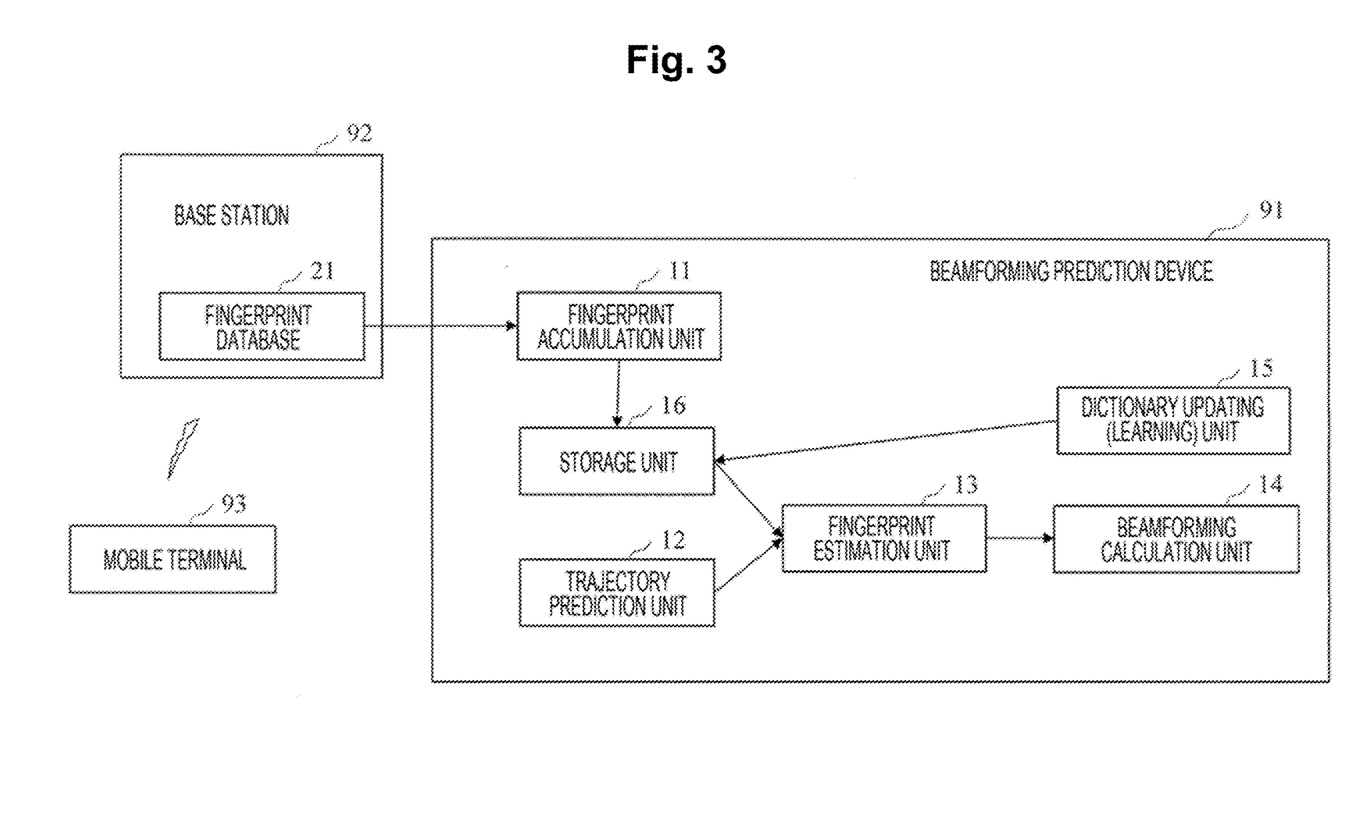
FIG. 3 illustrates an example system configuration according to the present disclosure.

A: MQ×M-dimensional matrix containing signatures of useful data symbols
$s_I(l)$: data vector including an interference symbol in a processing window
$A_I$: signature matrix (System Configuration According to the Present Disclosure)
FIG. 3 illustrates an example system configuration according to the present disclosure. A system according to the present disclosure is a communication system in which the base station 92 and the mobile terminal 93 communicate with each other, and includes a beamforming prediction device 91 that predicts a radio field strength from the different angles of arrival and departure of the base station 92.

The beamforming prediction device 91 according to the present disclosure includes a fingerprint accumulation unit 11, a trajectory prediction unit 12, a fingerprint estimation unit 13, a beamforming calculation unit 14, a dictionary updating (learning) unit 15, and a storage unit 16. The storage unit 16 stores the dictionary D of sparse coding and a trajectory-based fingerprint database. The beamforming prediction device 91 according to the present disclosure can also be formed with a computer and a program, and the program can be recorded in a recording medium or be provided through a network.

Figure 4:
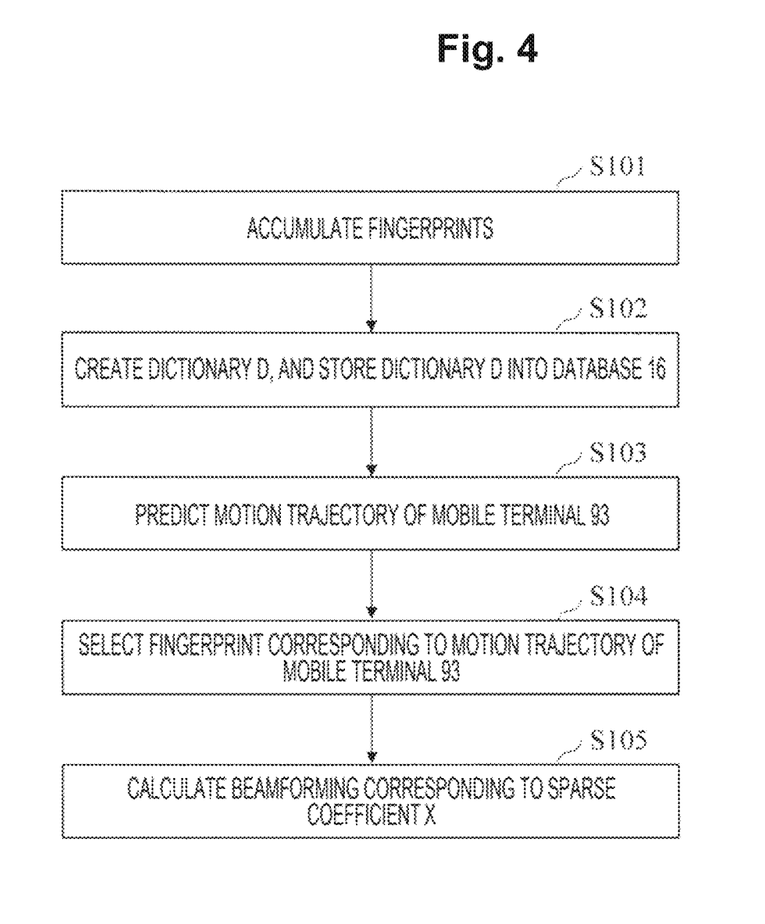
FIG. 4 illustrates an example of a beamforming prediction method according to the present disclosure.

(Beamforming Prediction Method)
FIG. 4 illustrates an example of a beamforming prediction method according to the present disclosure. The beamforming prediction device 91 carries out steps S101 to S105 described below. The beamforming prediction device 91 carries out steps S101 and S102 in advance, and stores the trajectory-based fingerprint database and the dictionary D into the storage unit 16. The stored fingerprint database and dictionary D may be created by learning performed in another device. To predict the beamforming conditions of the mobile terminal 93 of the user, steps S103 to S105 are carried out.

S101: the fingerprint accumulation unit 11 collects and accumulates fingerprint information.
S102: the dictionary updating (learning) unit 15 creates the dictionary D, using the fingerprint information accumulated in the fingerprint accumulation unit 11, and also stores the trajectory-based fingerprint database into the storage unit 16. In creating the dictionary D, information about the past trajectories of the mobile terminal is used as the test sample Y.
S103: the trajectory prediction unit 12 predicts a trajectory of the mobile terminal 93.
S104: the fingerprint estimation unit 13 calculates the sparse coefficient X corresponding to the trajectory predicted by the trajectory prediction unit 12, using sparse coding.

S105: the best AoA and AoD are acquired on the basis of the trajectory-based fingerprint database stored in the storage unit 16 and the sparse coefficient X.

(Fingerprint Information)

Figure 5:
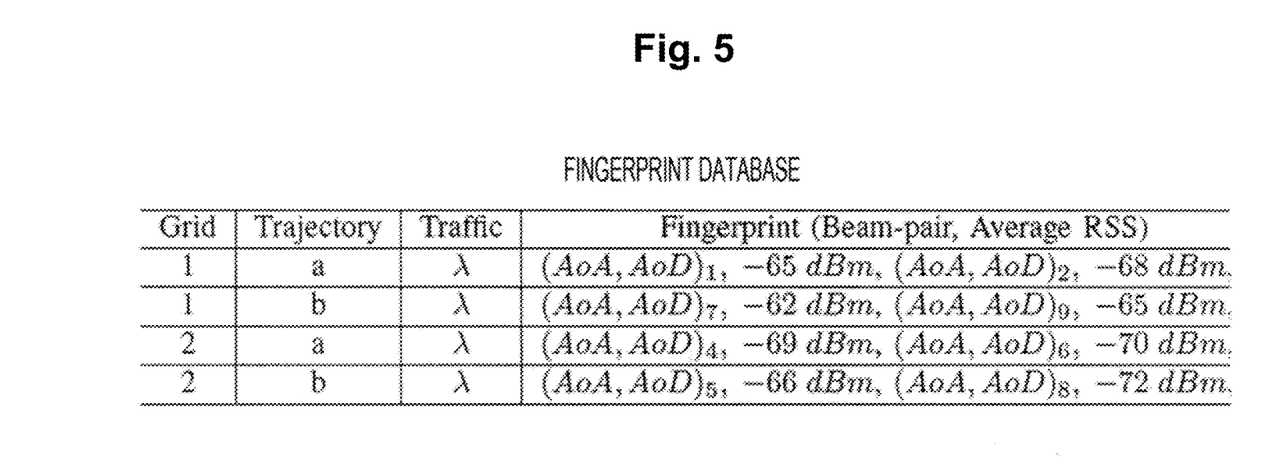
FIG. 5 illustrates an example of fingerprint information.

The fingerprint accumulation unit 11 collects and accumulates fingerprint information. FIG. 5 illustrates an example of the trajectory-based fingerprint database accumulated in the fingerprint accumulation unit 11. The fingerprint database stores trajectories and an RSS for each beam pair 1. A beam pair 1 is a pair of the kth base station 92 and the jth trajectory. An RSS is acquired for each beam pair 1 and for each pair of AoA and AoD. An RSS may be acquired for each traffic density. Trajectories "a" and "b" indicate a difference between the traveling directions of the mobile terminal 93. For example, the traveling direction of the trajectory a is opposite to the traveling direction of the trajectory b.

(Collection of Fingerprint Information in Step S101)

The fingerprint accumulation unit 11 collects fingerprints based on trajectories in advance. Angles of arrival (AoA), angles of departure (AoD), and radio field strengths (received signal to noise strengths (RSSs)) are collected in accordance with the movement trajectories of the mobile terminal 93 of the user.

The collection of fingerprint information is now described with reference to FIG. 6.

S201: in a grid indicating an area, the user repeatedly moves on the same trajectory at the same AoA. The base station 92 collects RSSs, using a different AoD each time. As a result, RSSs of various AoDs are obtained for one trajectory and one AoA.

S202: the user changes AoAs, and repeats the above process. As a result, RSSs of different AoAs and different AoDs are obtained for one trajectory.

S203: the user changes trajectories, and repeats the above two steps. As a result, RSSs of different AoAs, different AoDs, and different trajectories are obtained.

Here, a movement trajectory of the mobile terminal 93 of the user is approximated with the use of a grayscale image. The RSS is preferably acquired for each traffic density reflecting the density of obstacles. Also, because the RSS changes with time, measurement may be performed using a plurality of RSSs for the same pair of AoA and AoD at different times. For example, the average value of a plurality of RSSs may be used.

Fingerprint database collection is only required to be conducted once. After that, when a new fingerprint is accumulated in the fingerprint accumulation unit 11, it is only necessary to update the storage unit 16 according to a designed algorithm using a new fingerprint database.

In a state where each base station 92 holds a unique fingerprint database 21, the fingerprint accumulation unit 11 may acquire the fingerprint database 21 from the base station 92. Further, a base station 92 having all the knowledge accumulated in the fingerprint accumulation unit 11 may be installed. In this state, selecting a base station 92 is easy. In any state other than the above, the base stations 92 communicate with one another, and collects fingerprint information.

Further, as for the RSS in step S101, a channel or blockage may be analytically modeled, and the RSS may be calculated through a simulation. In this simulation, a model that takes into consideration the influence of obstacles in a communication system using millimeter waves may be used.

(Creation of the Dictionary D in Step S102)

In a state where the mobile terminal 93 is moving in the ith grid on a trajectory $U_1$, the RSS is expressed by the following expression.

[Mathematical Expression 6]

$$S_{i,k,j,l}^{t} = \begin{cases} \gamma S_{i,k,j,l}^{t-1} + (1-\gamma)S_{i,k,l}^{*}, & \text{if } \exists j, \mathcal{U}_{i,j} = \mathcal{U}_{i}^{*} \\ S_{i,k,l}^{*}, \mathcal{N}_{i}^{Trajectory} = \mathcal{N}_{i}^{Trajectory} \cup \mathcal{U}_{i}^{*}, & \text{otherwise,} \end{cases} \quad (6)$$

Here, $\gamma$ represents the forgetting factor that exponentially reduces the weights of old RSS records.

Using this information, the dictionary updating (learning) unit 15 learns the dictionary D of sparse coding. Specifically, the trajectory $U_1$ of the mobile terminal 93 being used by the user is applied to the test sample Y, and the sparse coefficient X is learned by the stored dictionary D. As a result, the sparse coefficient X corresponding to the trajectory $U_1$ of the mobile terminal 93 can be obtained.

When a new fingerprint is obtained, the dictionary updating (learning) unit 15 updates the stored trajectory-based fingerprint database and the stored dictionary D. For example, when real-time feedback is received from the mobile terminal 93 of the user, the dictionary D and the trajectory-based fingerprint database stored in the storage unit 16 are dynamically updated. As a result, the millimeter-wave transmission state can be correctly reflected.

(Trajectory Prediction in Step S103)

The trajectory prediction unit 12 predicts a trajectory of the mobile terminal 93 of the user, using location information about the mobile terminal 93 of the user collected from the base station 92. The location information about the mobile terminal 93 of the user can be acquired from the base station 92. Any known appropriate method can be used to predict a trajectory. For example, by smoothing location data with a Savitzky-Golay filter, and applying speed prediction to trajectory prediction, it is possible to accurately predict a trajectory of the mobile terminal 93 in a short look-ahead time (see Non Patent Literature 5, for example).

(Selection of a Fingerprint in Step S104)

In the present disclosure, the fingerprint selection problem is formulated as a sparse coding problem. Therefore, the fingerprint estimation unit 13 obtains the sparse coefficient X corresponding to the trajectory U predicted by the trajectory prediction unit 12, using the stored dictionary D.

Here, since not all the trajectories are included in the fingerprint database, fingerprint adaptation (fingerprint selection and assignment of the sparse coefficient X) is conducted. For example, the closest sparse coefficient x is selected as in the following expression.

[Mathematical Expression 7]

$$x_{i,k}^{*} = \min \|x_{i,k} \sigma_{i,k} * \Delta_i\|_1 \quad (7)$$

$$\text{s.t. } \|x_{i,k}\|_o \leq \epsilon$$

$$\|x_{i,k}\|_1 = 1$$

$$x_{i,k,j} \geq 0,$$

Here, in Hadamard multiplications,

[Mathematical Expression 71]

$$\Delta_{i,j,n} = \left| u_{i,n}^{Predict} - u_{i,j,n} \right| + 1 \quad (71)$$

and

[Mathematical Expression 72]

$$\sigma_{i,k,j,n} = q_{i,k,n}^{Predict} - q_{i,k,j,n} \quad (72)$$

Here, $q_{i,k,n}^{Predict}$ represents the distance between the user at the nth pixel of a grid i and the kth base station, and $q_{i,j,k,n}$ represents the distance between the pixel n on the jth training trajectory of the grid i and the kth base station. Epsilon represents a sparse constraint.

(Calculation of Beamforming Conditions in Step S105)

The beamforming calculation unit 14 selects the beamforming matching the fingerprint selected by the fingerprint estimation unit 13. As described above, the learned sparse coefficient X represents the weights to be assigned to the respective trajectories in the fingerprint database. The beamforming calculation unit 14 derives the beamforming a ($\varphi^{i,l}$, $\theta^{i,l}$), which is a combination of AoA and AoD, using the RSS of each trajectory stored in the fingerprint database and the weight indicated by the sparse coefficient X.

Specifically, the selection of the base station 92 and the beamforming can be conducted by solving the optimization problem expressed by the following expression using the sparse coefficient x as an input value. As a result, the transmission rate can be maximized.

[Mathematical Expression 8]

$$\arg \max_{l \in N_{i,k}^{Beam}, k \in N^{BS}} \sum_j x_{i,k,j} S_{i,k,j,l}. \quad (8)$$

Here, l represents the beam pair, i represents the serial number of grids, k represents the base station, and j represents the serial number of trajectories in the fingerprint database, and indicates the weight assigned to each trajectory j. Here, x is not affected by the serial number of base stations k, x_{i, k, j} can be reduced to x_{i, j}.

For example, in a state where j=3, x_{i, 1}=0.3, x_{i, 2}=0.7, and x_{i, 3}=0.0, S{i, k, 1, 1}, S{i, k, 2, 1}, and S{i, k, 3, 1} are read from the fingerprint database, and the base station k and the beam pair 1 are extracted from the fingerprint database so that the value expressed by the following expression is maximized.

(Mathematical Expression 9)

0.3·S{i, k, 1, 1}+0.7·S{i, k, 2, 1}+0.0·S{i, k, 3, 1} Given that the grid i is fixed, the best k and l can be found.

(Simulations)

Figure 7:
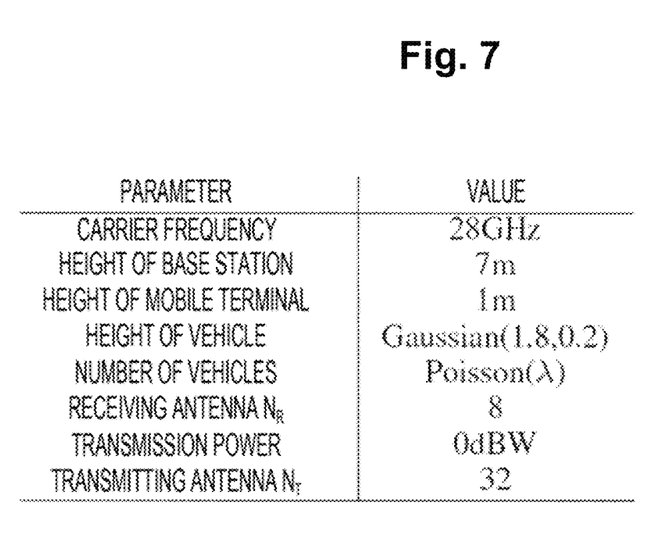
FIG. 7 shows the parameters used in a simulation.

The effects of an algorithm according to the present disclosure were evaluated through simulations. A typical street canyon scenario was used. In that street canyon scenario, two base stations 92 located at (0, 0) and (50, 0) were providing services in a rectangular area of 50 m×20 m in size (see Non Patent Literature 4, for example). Here, n=1.98, σ=3.1 dB, and b=0 were used as attenuation parameters expressed by Expression (21) in the state of LOS capable of viewing along a straight line connecting a transmitter and a receiver in wireless communication. Also, n=3.19, σ=8.2 dB, and b=0 were used as attenuation parameters expressed by Expression (21) in the state of NLOS incapable of viewing along a straight line connecting a transmitter and a receiver in wireless communication. Note that σ represents the $\sigma^2$ variance at $X_\sigma$. Other simulation parameters are shown in FIG. 7. Further, the user was allowed to move only in a horizontal direction.

As Comparative Example 1, another simulation was also conducted. In that simulation, when a location was designated, AoA-AoD having the best RSS was selected from the fingerprint database. Because the environment is dynamic, the RSSs in the fingerprint database are instantaneous RSSs.

Here, the optimum is the AoA-AoD accompanying the best (instantaneous) RSS performance. Further, a simulation in which accurate information about the transmission environment and the channel quality was used was conducted as Comparative Example 2.

Figure 8:
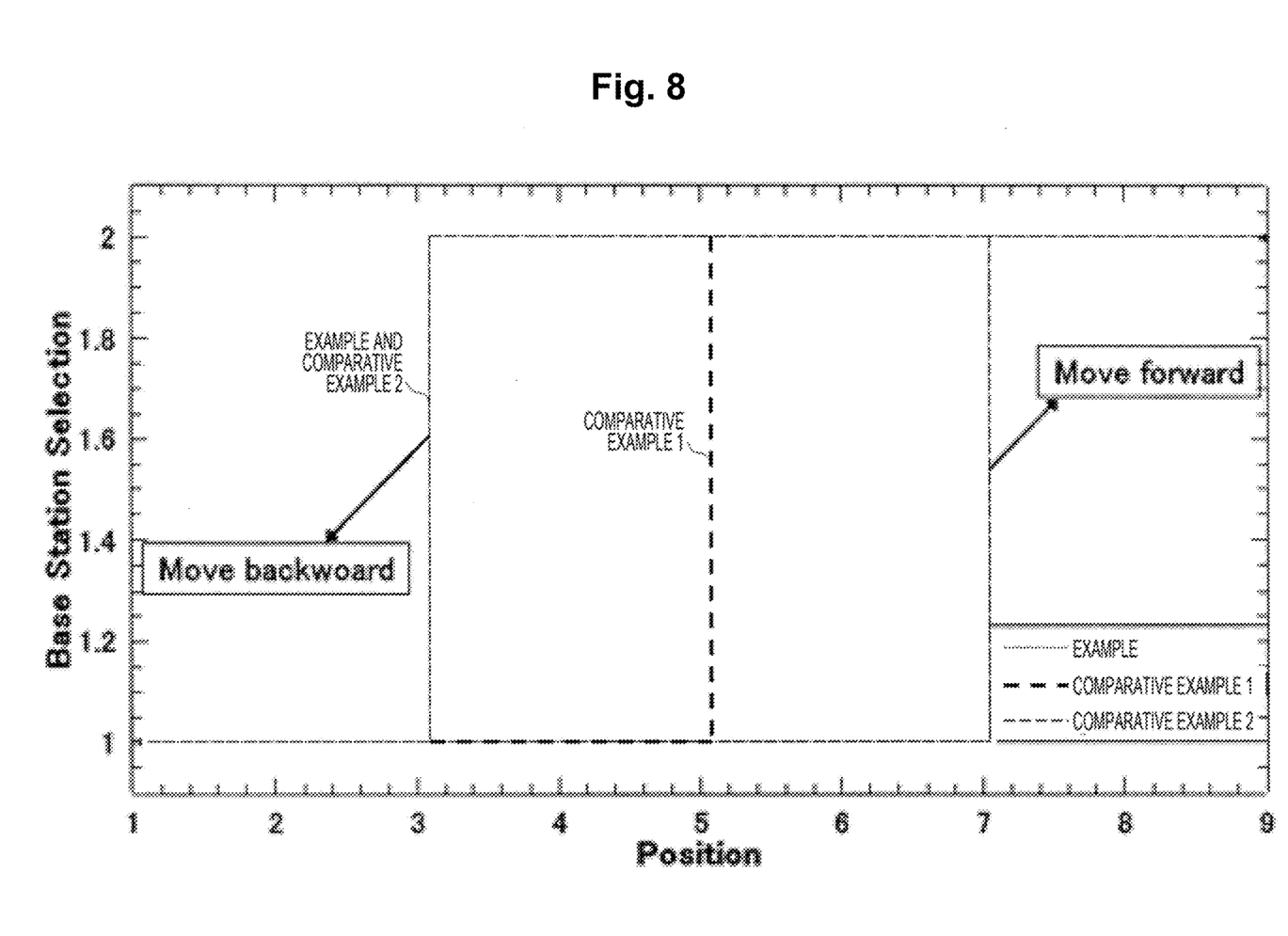
FIG. 8 illustrates a first example of simulation results.

FIG. 8 illustrates simulation results indicating which one of the two base stations is to be selected. The ordinate axis indicates which one of a first base station "1" and a second base station "2" is to be selected. In Comparative Example 1, the channel state cannot be accurately reflected in the context during movement, and therefore, the selection does not change with movement of the user. On the other hand, the present disclosure conforms to Comparative Example 2, and it can be seen that optimum performance can be achieved through base station selection.

Figure 9:
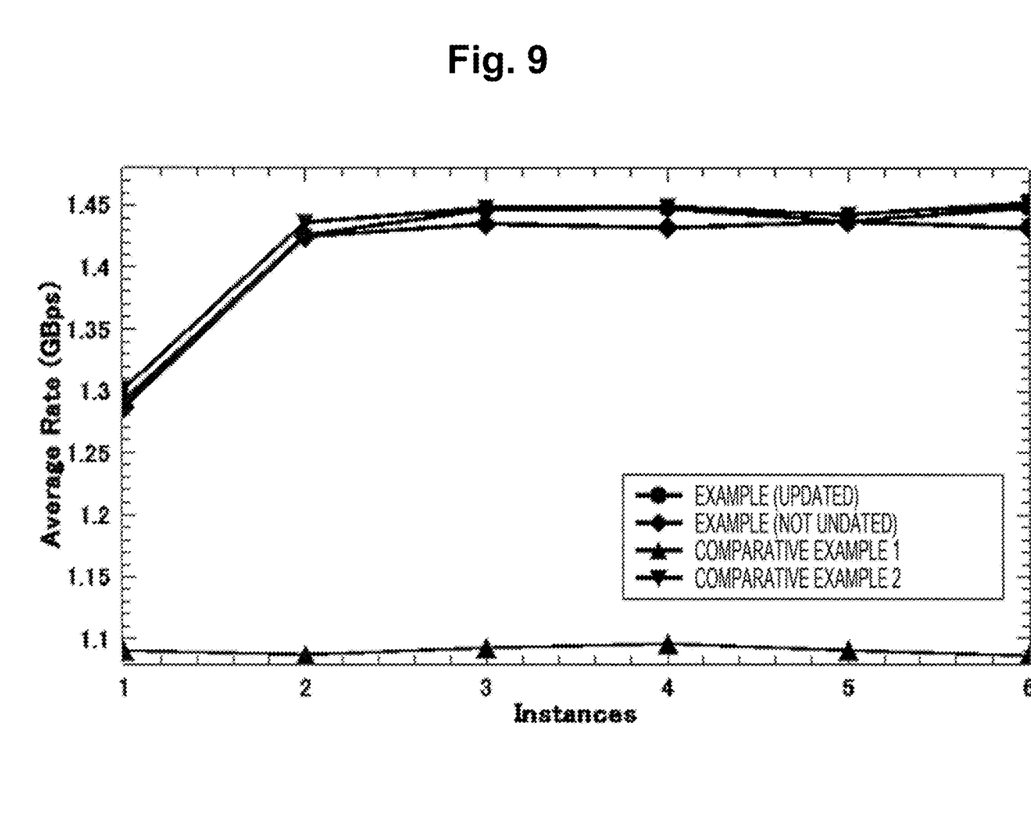
FIG. 9 illustrates a second example of simulation results.

FIG. 9 illustrates the results of a simulation of transmission rates in a case where the trajectory of the user is repeatedly changed six times (instances). Example (updated) indicates a status where the fingerprint database is updated, and Example (not updated) indicates a status where the fingerprint database is not updated. In Comparative Example 1, the transmission rate drops every time the trajectory changes. However, Examples conform to Comparative Example 2. It can be seen that the RSS according to the proposed method is almost the optimum, because the transmission rate does not drop. Comparison between Example (updated) and Example (not updated) shows that the performance according to the algorithm updating the fingerprint is superior to that of the example of keeping the fingerprint from updating.

INDUSTRIAL APPLICABILITY

The present disclosure can be applied in information and communication industries.

REFERENCE SIGNS LIST

11 fingerprint accumulation unit
12 trajectory prediction unit
13 fingerprint estimation unit
14 beamforming calculation unit
15 dictionary updating (learning) unit
16 storage unit
21 fingerprint database
91 beamforming prediction device
92 base station
93 mobile terminal

The invention claimed is:

1. A beamforming prediction device comprising:
   a storage unit that stores a fingerprint database and a dictionary, where the fingerprint database stores a plurality of fingerprints, each fingerprint includes the trajectory for a mobile terminal, a received signal strength for the mobile terminal, and a pair of beam arrival angle and beam departure angles for the mobile terminal dictionary, and the dictionary stores a set of feature vectors extracted from the fingerprint database;
   a trajectory prediction unit that calculates a trajectory of a mobile terminal, using location information about the mobile terminal;
   a fingerprint estimation unit that calculates a sparse coefficient corresponding to the trajectory of the given mobile terminal using sparse coding and the dictionary, where the sparse coefficient represents weights assigned to different trajectories; and a beamforming calculation unit that calculates beamforming of the mobile terminal, where beamforming is calculated by optimizing transmission rate of the given mobile terminal using the sparse coefficient and trajectories stored in the fingerprint database.

2. The beamforming prediction device according to claim 1, further comprising:
a fingerprint accumulation unit that acquires and accumulates a fingerprint corresponding to a trajectory of the mobile terminal from a base station; and
a dictionary updating unit that learns the dictionary D, when a new fingerprint is accumulated in the fingerprint accumulation unit, using the new fingerprint and updates the dictionary D and the fingerprint database stored in the storage unit.

3. The beamforming prediction device according to claim 1, wherein
each of the fingerprints includes a trajectory of the mobile terminal, a base station that communicates with the mobile terminal, and a parameter of beamforming for performing communication with the base station, and
the beamforming calculation unit calculates the base station to which the mobile terminal is to be connected, and the parameter of beamforming for performing communication with the base station, using the sparse coefficient X and the fingerprint database.

4. A beamforming prediction method comprising:
calculating, by a trajectory prediction unit, a trajectory of a given mobile terminal using location information about the mobile terminal;
providing a fingerprint database that stores a plurality of fingerprints, each fingerprint includes the trajectory for a mobile terminal, a received signal strength for the mobile terminal, and a pair of beam arrival angle and beam departure angles for the mobile terminal;
calculating, by a fingerprint estimation unit, a sparse coefficient corresponding to the trajectory of the given mobile terminal using sparse coding and a dictionary, where the sparse coefficient represents weights assigned to different trajectories, and the dictionary stores a set of feature vectors extracted from the fingerprint database;
calculating, by a beamforming calculation unit, beamforming for the given mobile terminal, where beamforming is calculated by optimizing transmission rate of the given mobile terminal using the sparse coefficient and trajectories stored in the fingerprint database.

5. A non-transitory computer-readable medium having computer-executable instructions that, upon execution of the instructions by a processor of a computer, cause the computer to:
calculating a trajectory of a given mobile terminal using location information about the mobile terminal;
storing a plurality of fingerprints in a fingerprint database, each fingerprint includes the trajectory for a mobile terminal, a received signal strength for the mobile terminal, and a pair of beam arrival angle and beam departure angles for the mobile terminal;
calculating a sparse coefficient corresponding to the trajectory of the given mobile terminal using sparse coding and a dictionary, where the sparse coefficient represents weights assigned to different trajectories, and the dictionary stores a set of feature vectors extracted from the fingerprint database;
calculating beamforming for the given mobile terminal, where beamforming is calculated by optimizing transmission rate of the given mobile terminal using the sparse coefficient and trajectories stored in the fingerprint database.

* * * * *